United States Patent
Stahl

(10) Patent No.: US 7,342,243 B2
(45) Date of Patent: Mar. 11, 2008

(54) DEVICE AND METHOD FOR READING OUT INFORMATION STORED IN A STORAGE LAYER

(75) Inventor: Werner Stahl, Heimstetten (DE)

(73) Assignee: Agfa-Gevaert HealthCare GmbH, Leverkusen (DE)

(*) Notice: Subject to any disclaimer, the term of this patent is extended or adjusted under 35 U.S.C. 154(b) by 179 days.

(21) Appl. No.: 10/610,273

(22) Filed: Jun. 30, 2003

(65) Prior Publication Data

US 2004/0004198 A1 Jan. 8, 2004

(30) Foreign Application Priority Data

Jul. 2, 2002 (EP) ................... 02014619

(51) Int. Cl.
*G03B 42/08* (2006.01)

(52) U.S. Cl. .................... 250/589; 250/484.4

(58) Field of Classification Search ........... 250/589, 250/584, 581, 582, 583, 585, 588, 484.4, 250/485.1, 484.5; 378/2, 22
See application file for complete search history.

(56) References Cited

U.S. PATENT DOCUMENTS

| | | | |
|---|---|---|---|
| 6,310,357 B1 | 10/2001 | Fuchs et al. | |
| 6,507,039 B2 * | 1/2003 | Gebele et al. | 250/584 |
| 6,621,094 B2 * | 9/2003 | Yasuda | 250/586 |
| 6,784,448 B2 * | 8/2004 | Neriishi et al. | 250/584 |
| 6,818,913 B2 * | 11/2004 | Yasuda et al. | 250/586 |
| 6,861,662 B2 * | 3/2005 | Chikugo | 250/589 |

FOREIGN PATENT DOCUMENTS

| | | |
|---|---|---|
| DE | 197 52 925 A1 | 6/1999 |
| DE | 199 46 743 C1 | 11/2000 |
| EP | 0 287 117 A1 | 10/1988 |
| EP | 0 903 930 A2 | 3/1999 |
| EP | 1 081 507 A2 | 3/2001 |
| EP | 02 01 4619 | 12/2002 |
| JP | 11-98314 A | 4/1999 |
| JP | 11-334947 A | 12/1999 |
| JP | 2000-214280 A | 8/2000 |
| JP | 2001-149352 A | 6/2001 |
| JP | 2001-248703 A | 9/2001 |

* cited by examiner

*Primary Examiner*—David Porta
*Assistant Examiner*—Marcus H Taningco
(74) *Attorney, Agent, or Firm*—Houston Eliseeva LLP

(57) ABSTRACT

A device and method for reading out information stored in a storage layer using a receiving device for receiving emission radiation that has been emitted from the storage layer. In this connection the storage layer is supported on a support surface that is defined by an x-y plane and a relative movement is generated between the receiving device and the storage layer in the x direction. The receiving device or the storage layer is guided during the generation of the relative movement by a guide system, on a guide surface that is independent of the storage layer. When guiding the receiving device, the level of the guide surface in a z direction coincides with the level of the support surface in the z direction.

13 Claims, 10 Drawing Sheets

DEVICE AND METHOD FOR READING OUT INFORMATION STORED IN A STORAGE LAYER

FIELD OF THE INVENTION

The present invention relates to a device and a method for reading out information stored in a storage layer according to the precharacterising part of claim 1 and claim 10.

Such a device and method are known from DE 197 52 925 A1. In this reference, a receiving means is guided on its own guide rails mounted adjacent to the storage layer.

A device and method for reading out information stored in a storage layer are also known from EP 1 081 507 A2. This reference discloses a device in which the receiving device is supported relative to the storage layer by an air cushion that rests on the storage layer. The distance between the receiving device and the storage layer should be maintained constant within small tolerance ranges. This should be guaranteed by a uniform air pressure between the air cushion and storage layer. On account of the small air gap, which is of an order of magnitude of about 2 μm, such air cushions can be displacedly formed only with difficulty along the storage layer in order thereby to permit an optimal readout of information.

SUMMARY OF THE INVENTION

One object of the present invention is to develop a device and a method of the type mentioned in the introduction in such a way that one storage layer can be read out efficiently and accurately.

The invention is based on the knowledge that the above object is solved if, as guide surface for guiding the receiving device or the storage layer when reading out the storage layer, such a guide surface is chosen whose level in the direction perpendicular to the plane that is spanned by the support surface coincides as exactly as possible to the level of the support surface for the storage layer in the direction perpendicular to the plane of the support surface. This applies advantageously to the whole course of the guide surface in the displacement direction (x direction). The course of the receiving device or of the storage layer therefore corresponds when reading out the storage layer—considered at least in this direction perpendicular to the plane that is spanned by the support surface—exactly to the course of the storage layer line on the support surface in the direction perpendicular to the plane of the support surface. In this way a uniform distance between the receiving device and storage layer and thus a good image sharpness can advantageously be ensured over the whole course of the storage layer.

Particularly preferred as guide surfaces is the support surface itself, on which the storage layer rests at least during the readout procedure, in particular—viewed in the displacement direction—edge regions of the support surface, or guide rails, along which the receiving device or the storage layer is guided at least during the execution of the relative movement. In this connection these guide rails in the direction perpendicular to the plane that is spanned by the support surface are exactly matched to the course of the support surface for the storage layer. In this way a very good accuracy is achieved during guidance.

Two guide surfaces are preferably provided, which are arranged on both sides of the support surface. In this way the guidance can be carried out particularly accurately.

In a particularly advantageous embodiment the two guide surfaces are connected, in particular integrally connected, directly to the support surface. The agreement over the course can thereby be realised in a technically simple manner and a particularly good agreement can be achieved.

The solution according to the invention furthermore provides the advantage that the guide surface can be optimised with regard to the use of air cushions. As has in fact been found in practice, for example the surface of the storage layers, for example phosphorus, is of only limited suitability for supporting air cushions thereon. This is due to the roughness of such a surface having regard to the extreme smoothness required for air cushions. In order to understand this it must be borne in mind that the air gap is particularly preferably between 1 μm and 4 μm, and a wedge gap of 2 μm can already lead to semi-fluid friction, in other words could scratch the support. When using a guide surface that does not form the storage layer, this may be formed to be extremely smooth, for example of glass. In this way air cushions can be used without any problem for supporting the receiving device, resulting in further advantages.

Preferably the bearing is designed as an air cushion, which is arranged in such a way that during operation of the device an air gap is formed between the bearing and the guide surface. Devices according to the invention are used for example as digital X-ray scanners, which place very stringent demands on the constancy of the rate at which the storage layer is read during the readout procedure. With sliding bearings that are normally employed the smooth running is disturbed on account of the friction effect, which cannot be completely prevented. Also, all types of roller bearings are not free of feedback.

Preferably the bearing device comprises at least two air cushions. The at least two air cushions form a pair of bearings and are arranged in the z direction, i.e. in the direction perpendicular to the broadening of the support surface, on both sides of the support surface. Due to the fact that two air cushions co-operate in the sense of bearing and counterbearing, the receiving device can be guided reliably virtually without any friction along the guide surface.

A particularly precise movement of the receiving device or of the storage layer can be realised if the air gap of an air cushion is between 1 and 5 μm, in particular 2 μm.

BRIEF DESCRIPTION OF THE DRAWINGS

Examples of implementation of the invention are described hereinafter with reference to the drawings, in which.

DETAILED DESCRIPTION OF THE INVENTION

Figure 1:
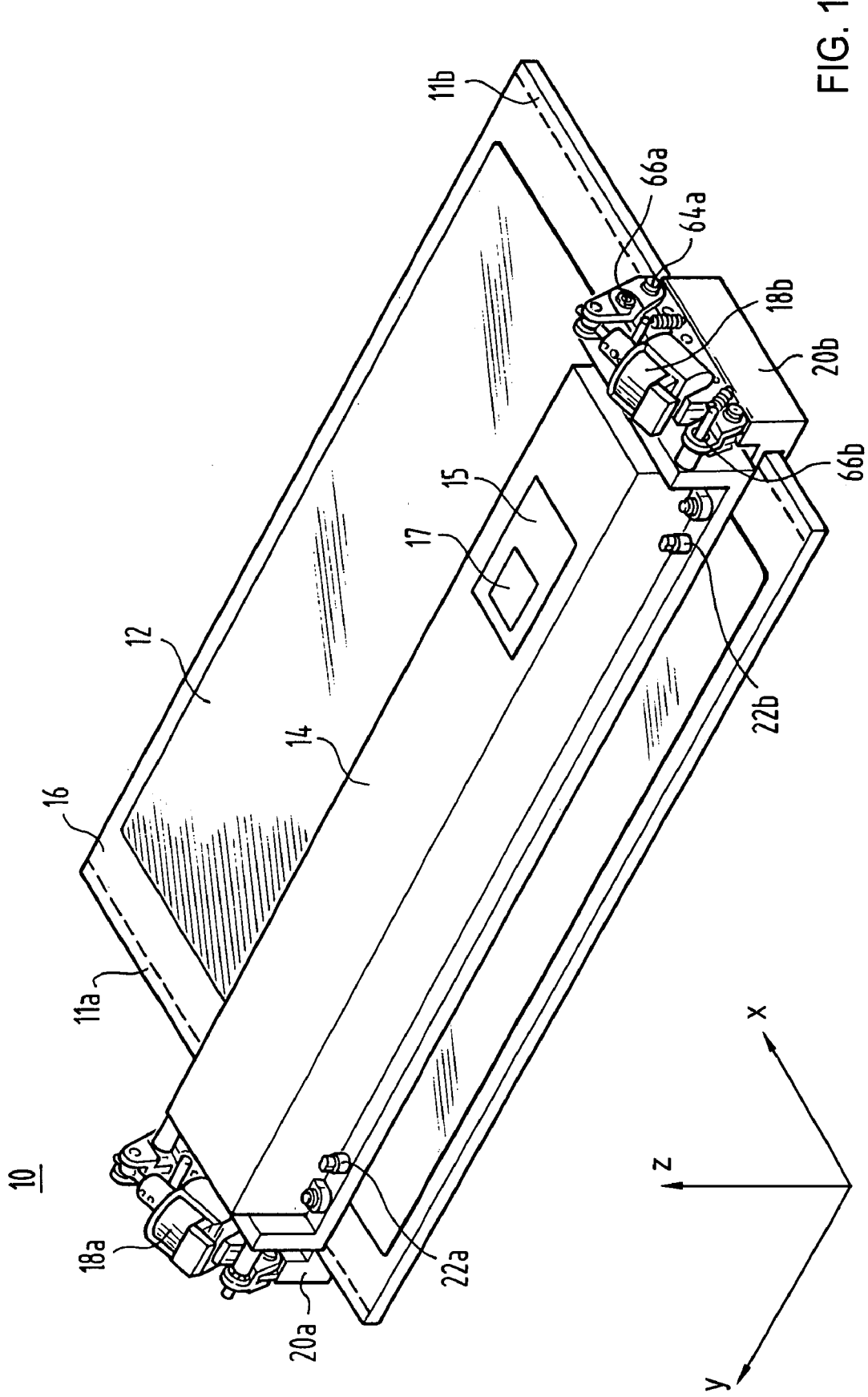
FIG. 1 is a diagrammatic perspective view of a first embodiment of a device according to the invention for reading out information stored in a storage layer.

FIG. 1 shows a digital scanner 10 for X-ray applications as a device according to the invention for reading out information stored in a storage layer 12 that is arranged on a support surface 16. The support surface 16 spans an x-y plane. A z direction runs perpendicular to this x-y plane. The scanner 10 comprises a scanning head 14 in which is arranged a receiving device for receiving emission radiation emitted from the storage layer 12. The receiving device may contain a CCD cell with imaging optics connected upstream. A radiation device for transmitting an excitation radiation is likewise arranged in the scanning head 14, or in a transmitted light scanner underneath the support surface 16. The radiation source may comprise a plurality of laser diodes arranged next to one another, whose radiations are guided via optical systems to the storage layer 12, whereby a line of the storage layer 12 can be excited. The scanning head 14 is connected via a first and a second adjustment unit 18a, 18b to a first and a second bearing device 20a, 20b, with which the scanning head 14 is guided on the support surface 16. The two bearing devices 20a, 20b are in this connection arranged in two edge regions 11a and 11b of the support surface 16. In this way it is ensured that the course of the edge regions 11a, 11b in the z direction coincides exactly with the course of the support surface 16. The respective level in the z direction of the edge regions 11a, 11b coincides with the level in the z direction of the support surface 16. During a readout procedure the scanning head 14, driven by a drive device not shown here, is guided in the x direction over the storage layer 12. The support surface 16 is here preferably made of glass. The glass surface may be made particularly smooth and thereby ensures a particularly exact guidance of the scanning head 14. FIG. 1 furthermore shows a control means 15 that serves to control the readout of the storage layer 12 by means of the scanner 10. The control means 15 is here mounted on the scanning head 14 and contains a memory 17 in which various information required for the readout is stored and which can be accessed by the control means 15 as necessary. The significance of a first and second callipers 22a, 22b is discussed in more detail hereinbelow. In this connection it is of course possible to use only one precision calliper instead of two precision callipers.

Figure 2A:
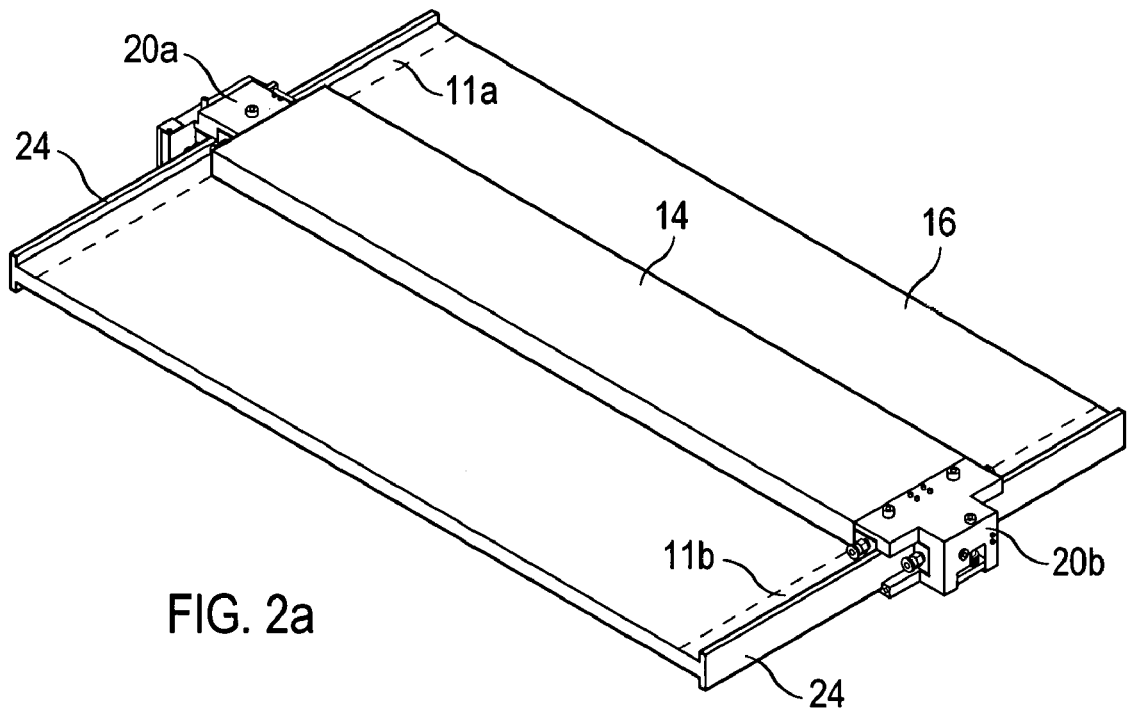
FIGS. 2*a*–2*c* illustrate a second embodiment of a device according to the invention after successive dismantling of parts of the device according to the invention.
Figure 2B:
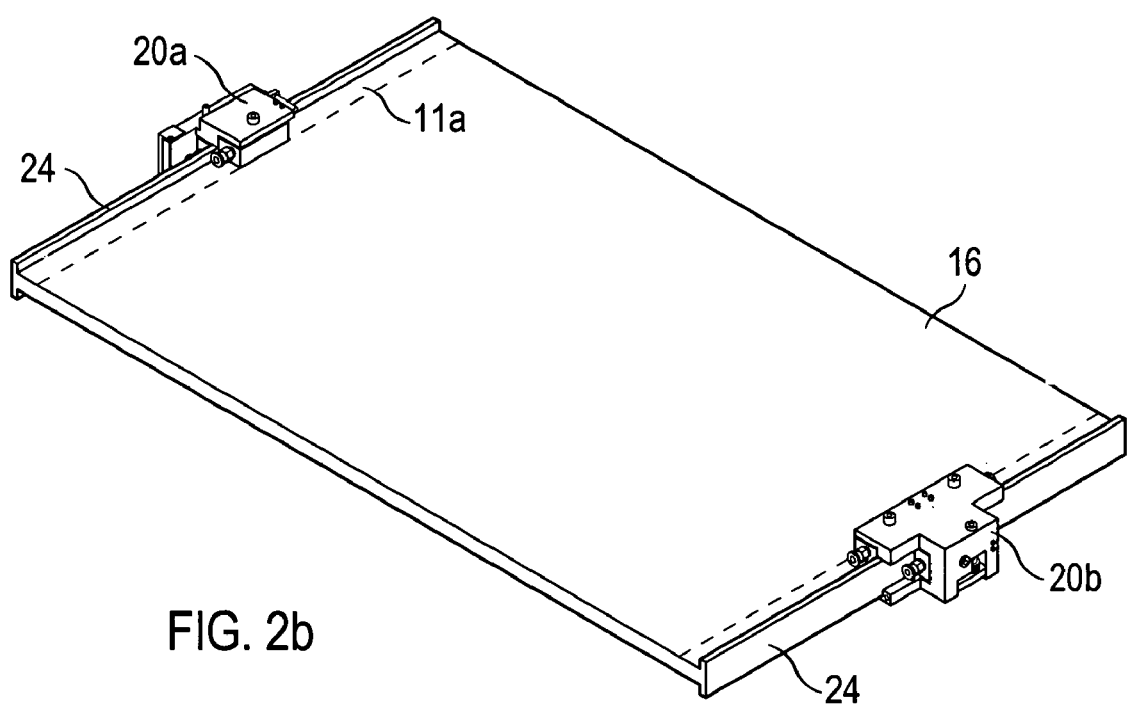
Figure 2C:
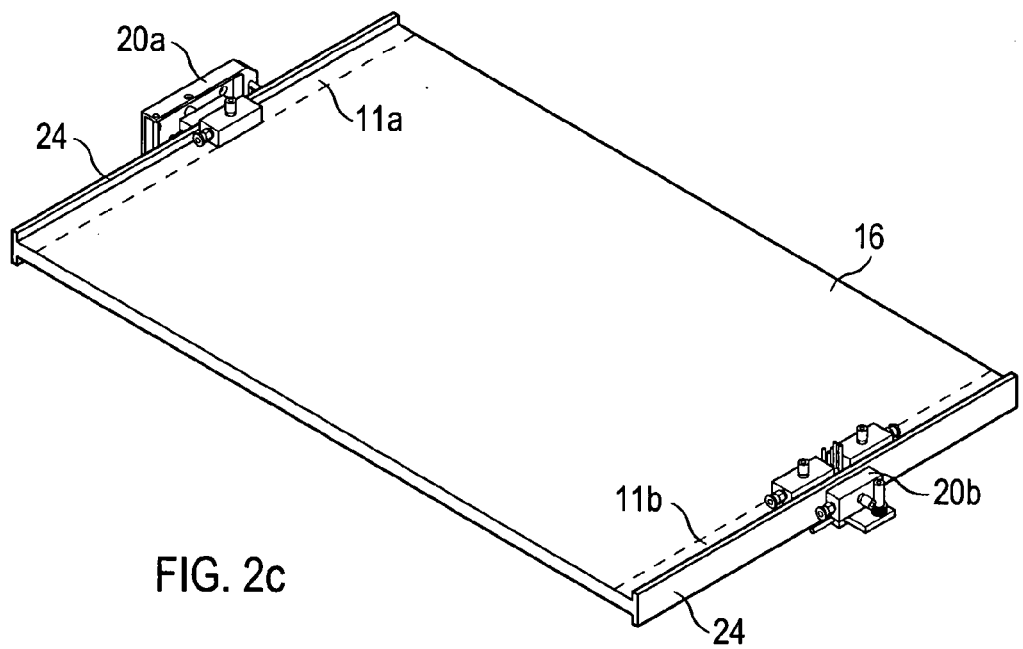

FIGS. 2a to 2c show a construction of the device according to the invention, in which the support surface 16 has pronounced edge rims 24 at the two ends in the y direction to provide a particularly simple bearing and guidance of the scanning head 14 relative to the support surface 16. These edge rims 24 serve to guide the scanning head 14 in the y direction. FIG. 2a shows the scanning head 14 after removal of its cover cap. The adjustment units 18a, 18b have likewise been removed and are thus not shown. FIG. 2b shows the arrangement of FIG. 2a without the scanning head 14, while FIG. 2c shows the arrangement of FIG. 2b in which the housing coverings of the left-hand and right-hand bearing device 20a, 20b have been removed.

Figure 3A:
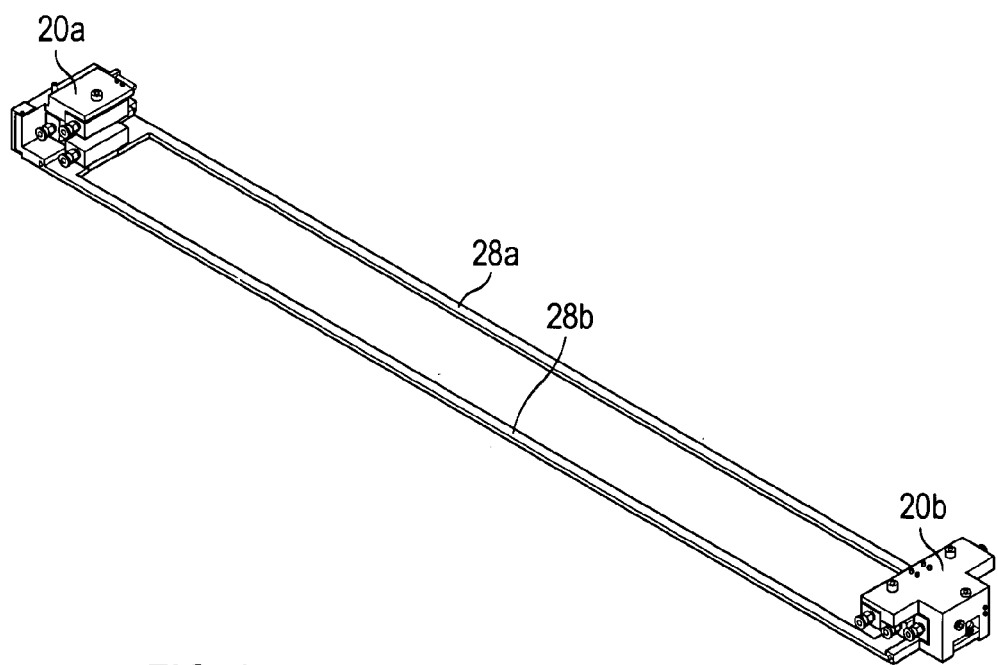
FIGS. 3*a*–3*d* illustrate the bearing of the receiving device of FIG. 2*b*.
Figure 3B:
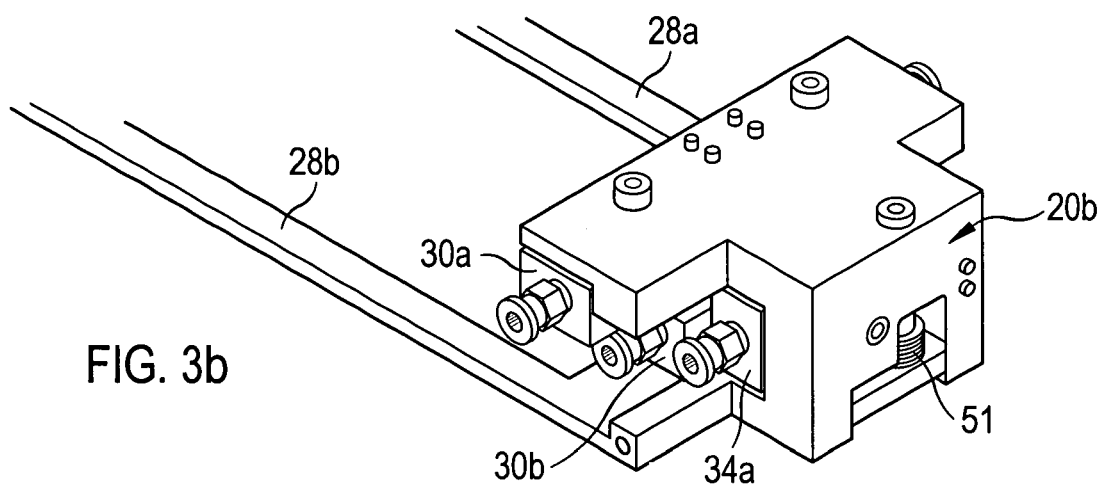
Figure 3C:
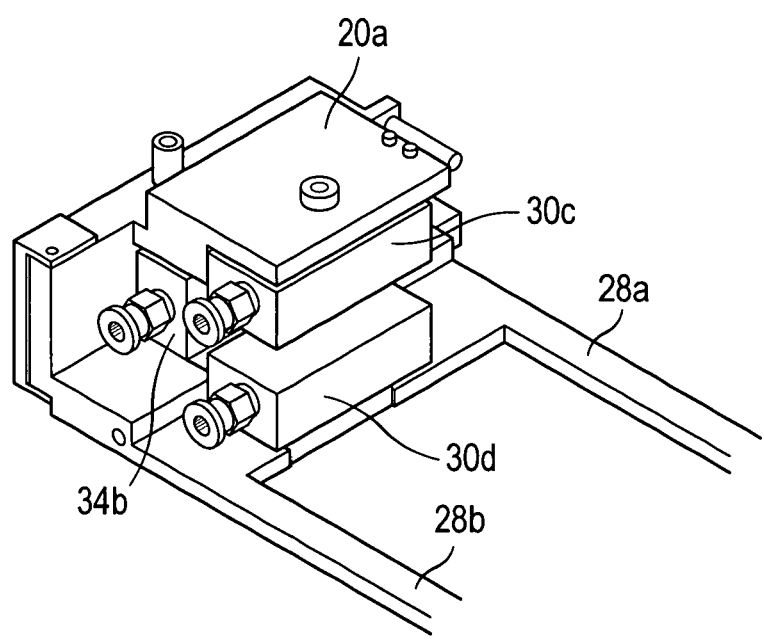
Figure 3D:
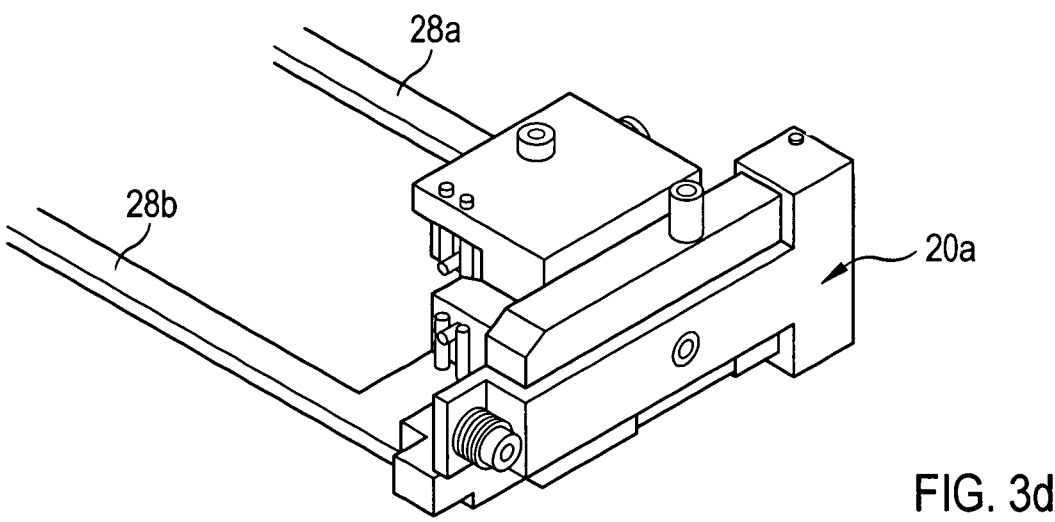

FIG. 3a corresponds to the view of FIG. 2b, in which however the support surface 16 has been removed from the drawing. It can be seen that the left-hand and the right-hand bearing device 20a, 20b are joined to one another via two webs 28a, 28b. FIG. 3b shows the right-hand bearing device 20b and FIG. 3c shows the left-hand bearing device 20a of FIG. 3a in detail. A rear view of the left-hand bearing device 20a is shown in FIG. 3d.

Figure 4:
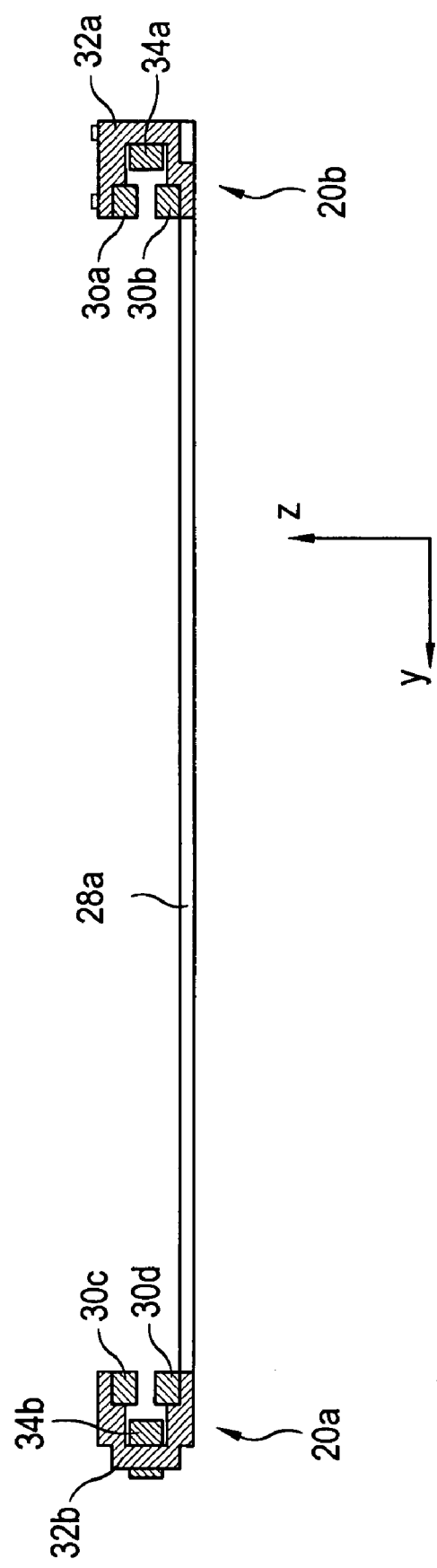
FIG. 4 is a partial sectional front view of FIG. 3*a*.

FIG. 4 shows diagrammatically a partial sectional front view of the representation of FIG. 3a, from which it can be seen that the bearing devices 20a and 20b involve two air cushions 30a, 30b and 30c, 30d that co-operate in the z axial direction. Via a connection 32a of the right-hand bearing device 20b and via a connection 32b of the left-hand bearing device 20a their respective air cushions 30a, 30b and 30c, 30d are pretensioned against one another in a spring-like manner in the z axial direction. Forces to effect the pretensioning may be produced for example by means of disc springs that act on the connections 32a and 32b. The air pressure generated in each case during operation by the air cushions produces counterforces to the forces generated by the disc springs. In the y direction two air cushions 34a, 34b co-operate in the sense of a bearing and a counterbearing. The air cushions 34a, 34b in the y direction are likewise pretensioned against one another in a spring-like manner. The support surface 16 on which the various air cushions rest is clamped as if between pincers by the pair of air cushions.

Figure 5A:
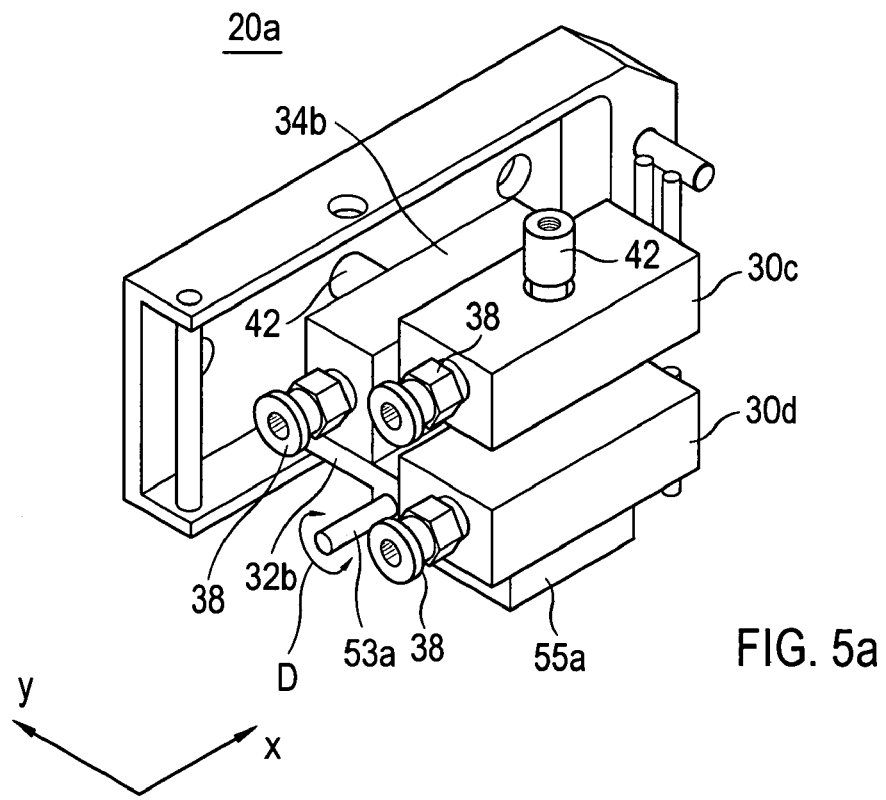
FIGS. 5*a, b* are detailed views of details of FIG. 3*b*.
Figure 5B:
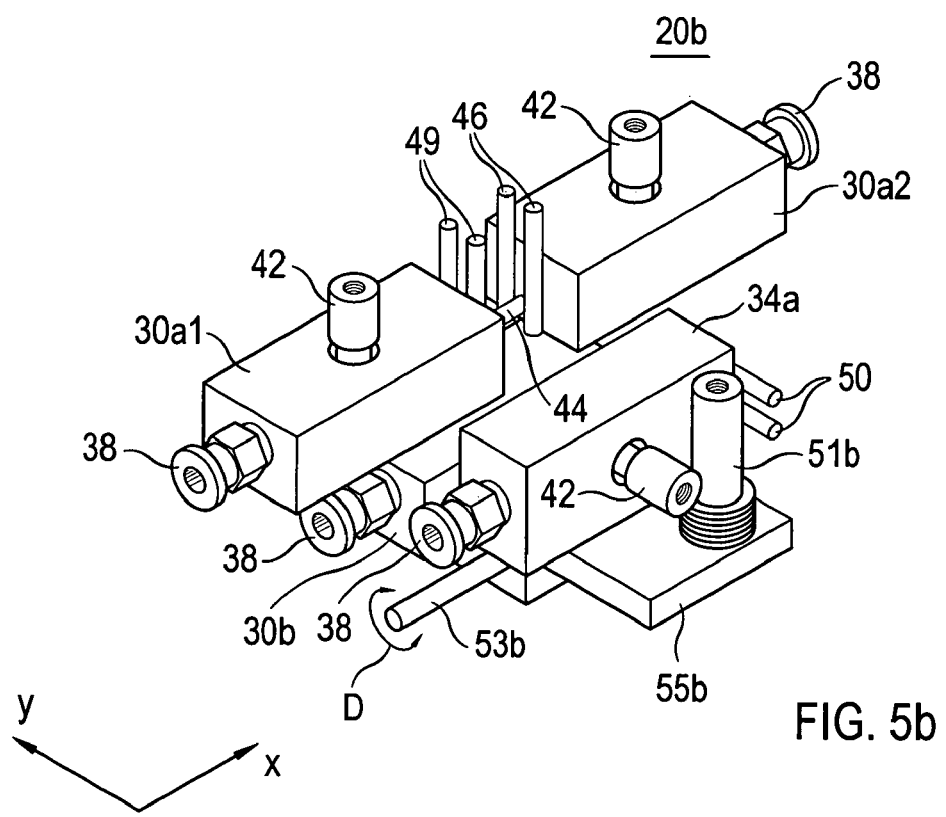
Figure 6A:
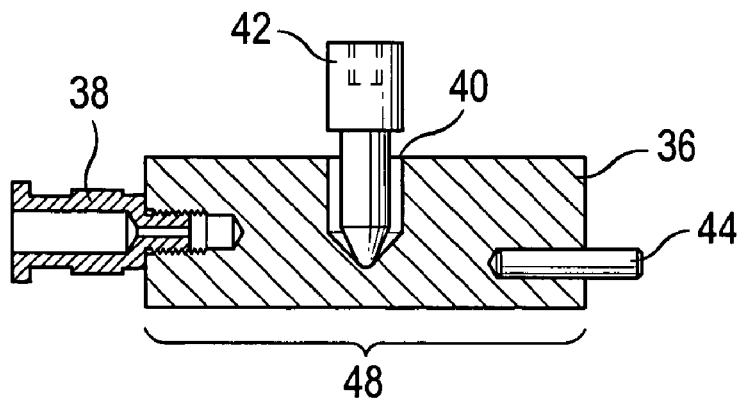
FIG. 6 is a detailed view of a preferably used air cushion.

FIG. 5a shows the air cushions 30c, 30d and 34b of the left-hand bearing device 20a, and FIG. 5b shows the air cushions 30a1, 30a2, 30b and 34a of the right-hand bearing device 20b with a greater degree of accuracy. One of the air cushions that is used is shown in a representational manner in FIGS. 6a to c, without specifying its installation site in one of the bearing devices 20a, 20b, generally identified by the reference numeral 36. The air cushion 36 comprises an air connection 38 as well as a bearing 40, in which for example a conical screw 42 is arranged to produce a point-like bearing, which screw is to be rigidly connected to the associated housing covering of the respective bearing device 20a, 20b and thus with the scanning head 14 to be supported. For this purpose the head of the conical screw 42 is provided with a thread. A self-adjusting bearing is achieved by the point-like bearing via the tip of the conical screw 42.

Figure 6B:
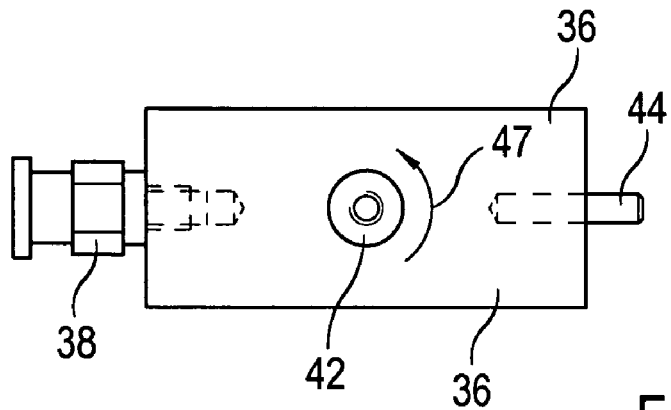
Figure 6C:
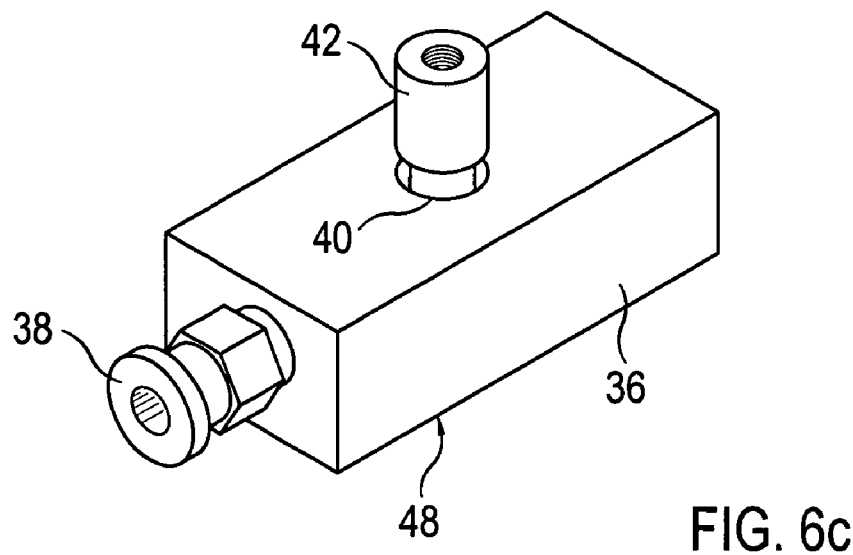

FIG. 6b shows a plan view of the air cushion 36. An anti-torsion device 44 is arranged in the air cushion 36 in order to prevent the air cushion 36 rotating in the direction identified by the arrow 47 in FIG. 6b. The air outlet side of the air cushion 36 is identified by the reference numeral 48. This contains air outflow openings through which the air introduced into the bearing via the air connection 38 is blown out.

Returning now to the representation shown in FIG. 5b, it can be seen that the upper air cushion 30a (see FIG. 4) in this case includes two air cushions 30a1, 30a2 that are arranged adjacent to one another in the x direction. In this way it is ensured that the scanning head 14 does not tilt about the y axis during the activation of the air cushions. Here, anti-torsion devices 46 for the air cushion 30a2, anti-torsion devices 49 for the air cushion 30a1 and anti-torsion devices 50 for the air cushion 34a correspond to the anti-torsion device 44 generally described above. The anti-torsion devices 46, 49, 50 are secured at their respective ends shown in FIG. 5b to the housing covering (not shown) of the bearing device 20b. The conical screws 42 of FIGS. 5a, 5b are connected to one another via the connections 32a, 32b, to the bearing and counterbearing, and are also connected to the scanning head 14.

FIG. 5b shows in addition a disc spring 51b that serves to generate a force for producing a pretensioning of the pair of air cushions 30a1, 30a2 and 30b in the z direction. The disc spring 51b is provided on its upper side with a thread via which the disc spring 51b can be secured to the housing covering of the bearing device 20b (see also the diagram in FIG. 3b). The force generated by the disc spring 51b is transmitted here via a connecting plate 55b to the air cushion 30b that is joined to the connecting plate 55b. The connecting plate 55b is in this connection connected to a rotating shaft 53b running in the x direction, the shaft permitting a tilting of the connecting plate 55b and thus of the air cushion 30b along a rotation direction D. The rotating shaft 53b is secured at both ends to the housing (not shown) of the bearing device 20b. The air pressures generated by the air cushions 30a1, 30a2 and 30b in operation form a counter-force to the force generated by the disc spring 51b. In this way a pincer-like bearing of the support surface 16 that is located between the bearings 30a1, 30a2 and 30b is produced. A further disc spring (not shown) corresponding to the disc spring 51b, a connecting plate 55a as well as a rotating shaft 53a are provided for the bearing device 20a in order also to ensure the pincer-like bearing of the support surface 16.

Figure 7A:
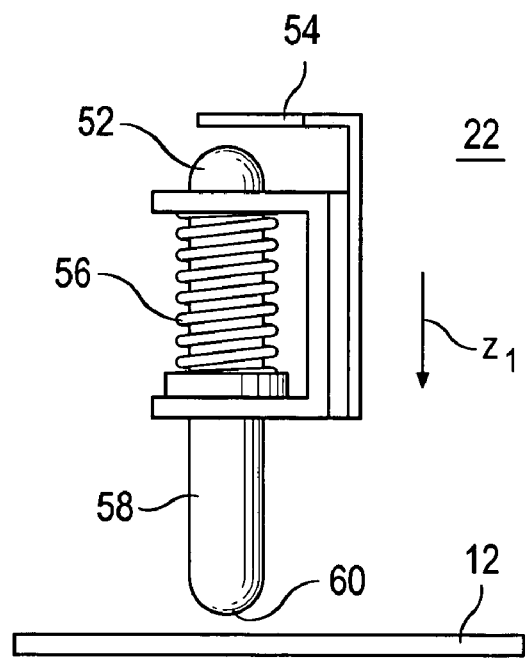
FIGS. 7*a, b* illustrate a side view and perspective view of a precision calliper preferably used in the device according to the invention.
Figure 7B:
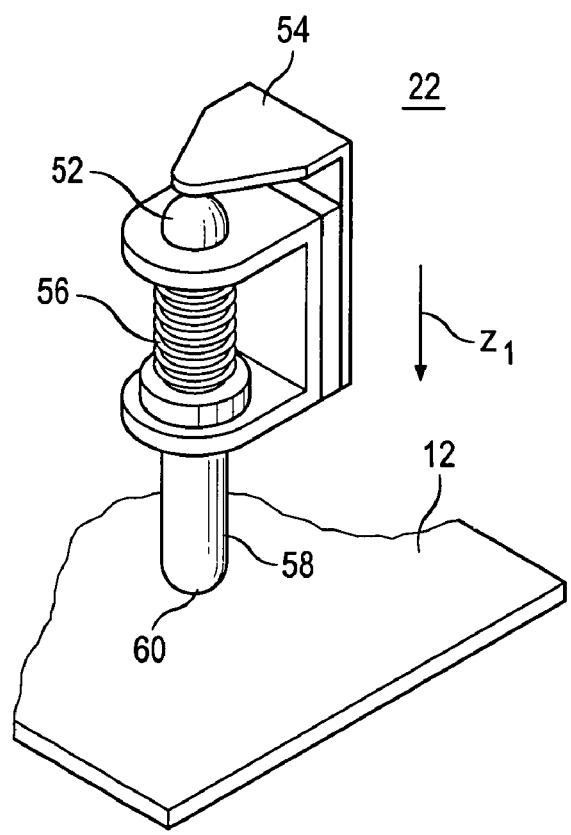

FIGS. 7a and 7b show an embodiment of the precision calliper 22 already illustrated in FIG. 1. The precision calliper 22 is connected to the scanning head 14, in which connection it may advantageously be provided that the precision calliper is displacedly arranged in the y direction. In order to scale the distance between the storage layer 12 and the receiving device contained in the scanning head 14, the scanning head 14, which is connected to the precision calliper 22, is lowered in the $z_1$ direction, i.e. in the direction of the storage layer 12, until an upper side 52 of a contact pin 58 comes into contact with a contact spring 54. In this case a lower side 60 of the contact pin 58 is in contact with the storage layer 12. A spring 56 ensures that, without corresponding pressure on the lower side 60 of the contact pin 58, i.e. without resistance due to the storage layer 12, the upper side 52 of the contact pin 58 and the contact spring 54 are not in contact. After a scaling carried out in the afore-described manner, an optimal distance between the storage layer 12 and receiving device of the scanning head 14 is adjusted by means of the adjustment unit 18 shown in FIG. 8, by retracting the scanning head 14 by the optimal distance in the opposite $z_1$ direction, after the head has come into contact with the contact spring 54 through the upper side 52 of the contact pin 58. In this way an interspacing is formed between the lower side 60 of the contact pin 58 and the storage layer 12. The adjustment of the optimal distance is controlled for the sake of simplicity by the control means 15 (FIG. 1). The optimal distance may have been determined by a previously executed calibration of the scanner. The adjustment of the optimal distance ensures in particular that the image sharpness during the readout of the storage layer 12 is extremely good and is uniform as far as possible over the whole area of the storage layer 12.

Figure 8:
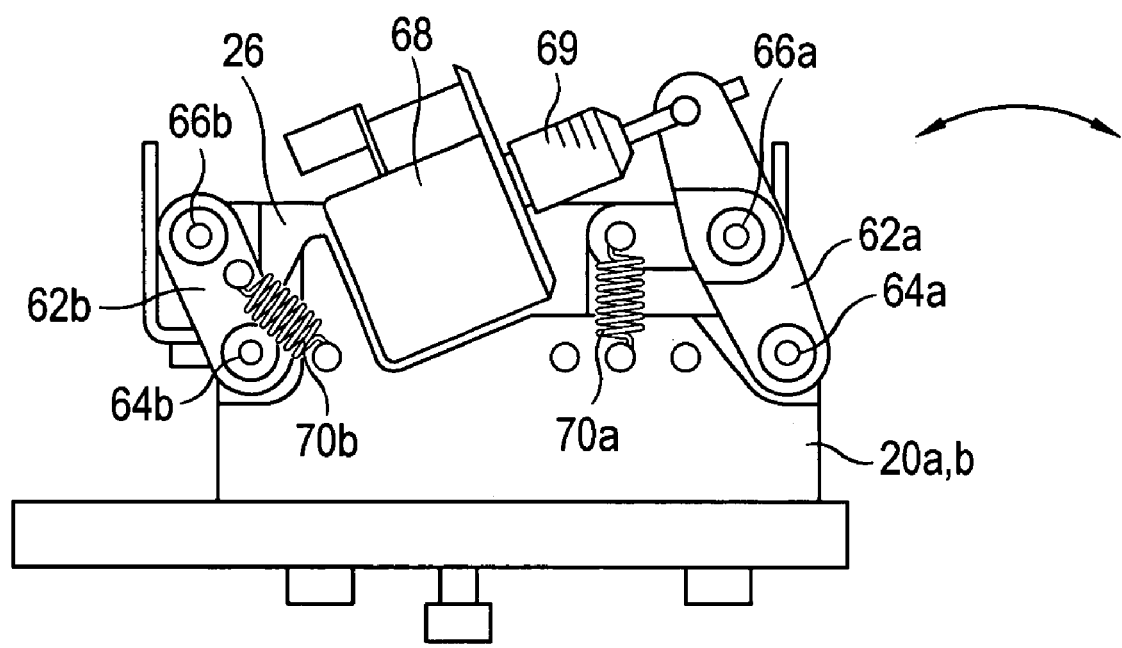
FIG. 8 is a detailed view of an adjustment unit that can be preferably used.

With reference to FIG. 8, the adjustment unit 18 comprises two rods 62a, 62b guided in parallel, which on the one hand are coupled via bearings 64a, 64b to one of the bearing devices 20a, 20b, and on the other hand are coupled via bearings 66a, 66b to the scanning head 14. The rod 62a can be deflected by a stepping motor 68 with integrated spindle 69, this movement being transmitted as a corresponding deflection to the rod 62b. In this way the distance between the storage layer 12 and receiving device, i.e. scanning head 14, can be very precisely adjusted. Springs 70a, 70b provide for a clamping of the adjustment unit 18 that is as far as possible free from play.

Such a distance adjustment may be carried out for different storage layers in each case before beginning a readout procedure, the distance advantageously being maintained constant during the readout procedure. This improves the readout quality since different storage layers, due to production conditions, have in particular different thicknesses, which means that with different storage layers 12 there would be different distances between the surface of the respective storage layer 12 and the receiving device contained in the scanning head 14. The distance may advantageously be finely adjusted during a readout procedure. For the sake of simplicity this is performed by means of the control means 15. It is advantageous, particularly for the implementation of the last-mentioned variant, if the distance is constantly measured during a scanning procedure. A mechanical scanning by means of a measuring wheel for example is suitable for this purpose; the wheel runs with a minimal bearing force on the surface of the storage layer 12 during the scanning process and transmits the level of the storage layer to a measuring system. Alternatively, a contactless distance measuring device may also be used, in which connection however care should be taken to ensure that the storage layer is not thereby excited to emit radiation.

It may be envisaged that, for repeated readout procedures of the same storage layer 12, the result of the previously executed scaling or distance measurement be recorded in a memory 17 (see FIG. 1) and allocated to the storage layer. This can be realised in a particularly advantageous manner if the storage layer 12 is mounted in a cassette and this cassette has access to such a memory. In order to read out the storage layer 12 contained in the cassette, the latter is inserted into the scanner according to the invention and the storage layer 12 is then removed from the cassette and inserted into the scanner. The result of the previously executed distance measurement or scaling stored in the memory can for the sake of simplicity be transmitted by a transponder to the device according to the invention for the readout of the information from the storage layer. It is however also possible to store the result of the previously executed distance measurement or scaling in the memory 17 of the scanner after the execution of the procedure. After re-identifying the associated storage layer, the stored distance from the scanning head 14 to the support surface 16 can be accessed and adjusted.

Figure 9:
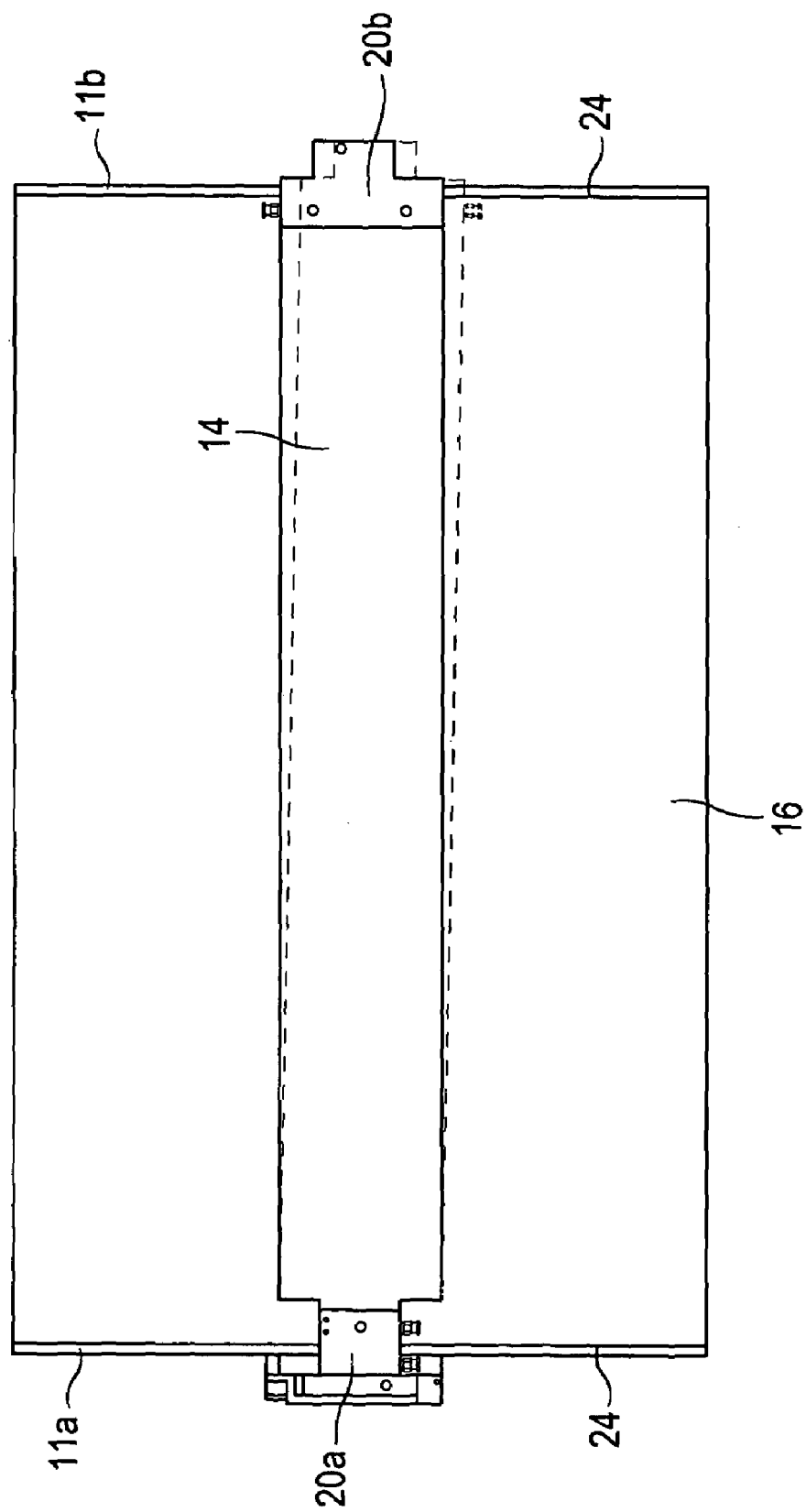
FIG. 9 is a diagrammatic view of the oscillatory movements of the receiving device made possible by the use of air cushions, illustrated for example by oscillations about the z axis.

FIG. 9 shows that an oscillation of the scanning head 14 about the z axis is made possible by the use of air cushions, without resulting in a slip-stick effect. In this way the device according to the invention is particularly suitable also for a bilateral drive of the receiving device.

The device according to the invention can be used both with variants in which the storage layer 12 and the support surface 16 are fixedly mounted in the device. The device can however also be used in a variant in which the storage layer 16, optionally mounted on an additional carrier layer, for example of aluminium, is included in the device simply for reading out the storage layer 12.

In the case where it is signalled, via a transponder associated with the storage layer, that no scaling or distance measurement has yet been carried out for the corresponding storage layer, it may be envisaged that this be initiated automatically by the readout device according to the invention.

The foregoing description of the present invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

The invention claimed is:

1. Device for reading out information stored in a storage layer, comprising:
   a receiving device for receiving emission radiation emitted from the storage layer;
   a support surface for supporting the storage layer, wherein an x-y plane is defined by the support surface; and
   a guide means for guiding the receiving device on a guide surface during the execution of a relative movement between the receiving device and the storage layer in the x direction, the guide surface being end portions of the support surface and resident within the x-y plane.

2. Device according to claim 1, wherein the support surface comprises glass.

3. Device according to claim 1, wherein the guide means comprises a bearing for supporting the receiving device.

4. Device according to claim 3, wherein the bearing is formed as an air cushion.

5. Device according to claim 4, wherein the bearing comprises at least two air cushions that form a pair of bearings that are arranged on both sides of the guide surface in a z direction that runs perpendicular to the x-y plane defined by the support surface.

6. Device according to claim 5, wherein the air cushions of the pair of bearings are connected to one another in a pincer-like manner and are pretensioned against one another.

7. Method for reading out information stored in a storage layer using a receiving device for receiving emission radiation that has been emitted from the storage layer, wherein the storage layer is located within a substrate having a support surface defined by an x-y plane, said method comprising:
   a) reception by the receiving device of emission radiation emitted from the storage layer;
   b) generation of a relative movement between the receiving device and the storage layer in the x direction; and
   c) guidance of the receiving device during the generation of relative movement of using a guide means, on a guide surface defined as end portions of the support surface and resident within x-y plane.

8. A device for reading out information stored in a storage layer, comprising:
   a receiving device for receiving emission radiation emitted from the storage layer;
   a support surface for supporting the storage layer, wherein an x-y plane is defined by the support surface; and
   a guide for guiding the receiving device on a guide surface during the execution of a relative movement between the receiving device and the
   storage layer in the x direction, the guide surface being end portions of the support surface and resident within the x-y plane.

9. A device according to claim 8, wherein the support surface comprises glass.

10. A device according to claim 8, wherein the guide comprises a bearing for supporting the receiving device.

11. A device according to claim 10, wherein the bearing is formed as an air cushion.

12. A device according to claim 10, wherein the bearing comprises at least two air cushions that form a pair of bearings that are arranged on both sides of the guide surface in a z direction that runs perpendicular to the x-y plane defined by the support surface.

13. A device according to claim 12, wherein the air cushions of the pair of bearings are connected to one another in a pincer-like manner and are pretensioned against one another.

* * * * *